United States Patent
Hulka et al.

(10) Patent No.: US 9,464,433 B1
(45) Date of Patent: Oct. 11, 2016

(54) SELF-TIGHTENING SPLICE

(71) Applicant: USG Interiors, LLC, Chicago, IL (US)

(72) Inventors: Samuel D. Hulka, Mount Prospect, IL (US); Peder J. Gulbrandsen, Aurora, IL (US); Abraham M. Underkofler, Kenosha, WI (US)

(73) Assignee: USG INTERIORS, LLC, Chicago, IL (US)

( * ) Notice: Subject to any disclaimer, the term of this patent is extended or adjusted under 35 U.S.C. 154(b) by 0 days.

(21) Appl. No.: 14/844,454

(22) Filed: Sep. 3, 2015

(51) Int. Cl.
*E04B 9/10* (2006.01)
*F16B 15/00* (2006.01)

(52) U.S. Cl.
CPC ............... *E04B 9/10* (2013.01); *F16B 15/003* (2013.01)

(58) Field of Classification Search
CPC .... Y10S 403/12; Y10S 403/15; Y10S 52/06; Y10S 411/921; Y10S 24/33; F16B 5/0008; F16B 5/008; F16B 15/0046; Y10T 403/551; E04B 9/10
See application file for complete search history.

(56) References Cited

U.S. PATENT DOCUMENTS

| | | | | |
|---|---|---|---|---|
| 1,697,456 A | * | 1/1929 | Carlson | E06B 1/6015 16/384 |
| 1,724,288 A | * | 8/1929 | La Brecque | A47G 27/0456 16/4 |
| 2,217,574 A | * | 10/1940 | Tinnerman | F16B 5/125 52/718.06 |
| 5,154,031 A | * | 10/1992 | Wall | E04B 9/10 403/346 |
| 7,721,400 B2 | * | 5/2010 | Parent | B25C 11/00 144/330 |
| 8,782,985 B2 | | 7/2014 | Gulbrandsen et al. | |
| 2013/0180202 A1 | * | 7/2013 | Woods | A47B 5/00 52/710 |

* cited by examiner

*Primary Examiner* — Jonathan Masinick
(74) *Attorney, Agent, or Firm* — Pearne & Golden LLP

(57) ABSTRACT

A splice clip for a trim strip of the type having a receiving track with re-entrant flanges, the clip being formed as a single piece sheet metal body having an elongated configuration with parallel edges along opposed long sides lying in a flat plane, a locking tab on each longitudinal half of the body supported on an integral hinge, each locking tab having a locking edge eccentric of the respective hinge, each locking tab being pivotal on the respective hinge from an initial position with said locking edge in said plane to a locking position in which said locking edge is out of said plane whereby it is adapted to frictionally lock against a surface of the trim strip associated with the clip receiving track.

8 Claims, 3 Drawing Sheets

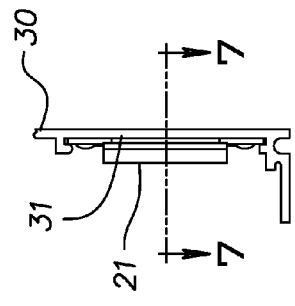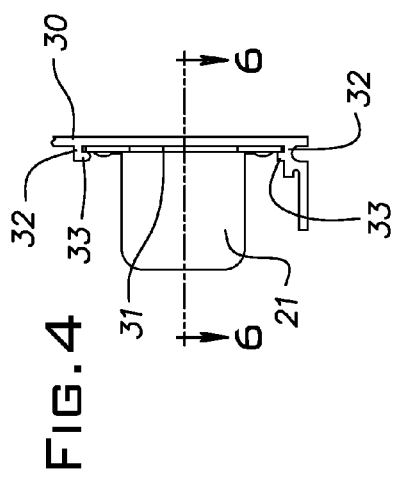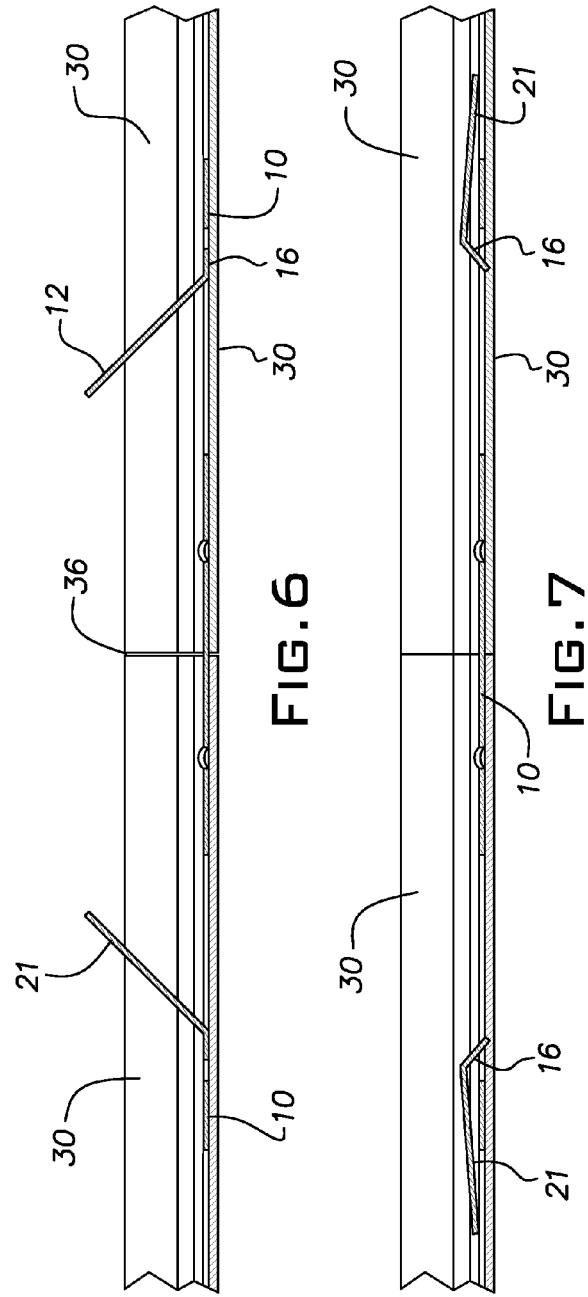

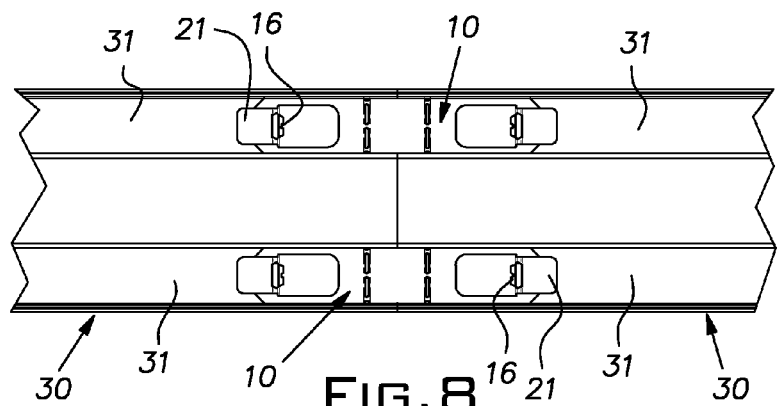
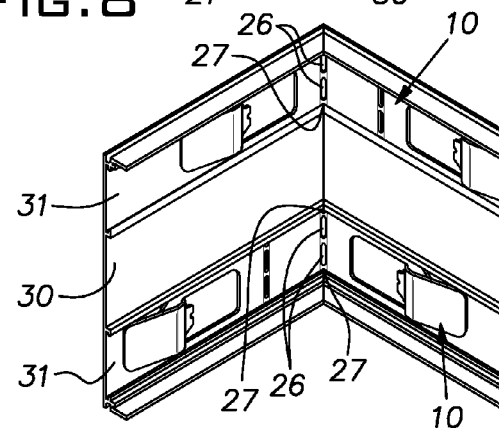
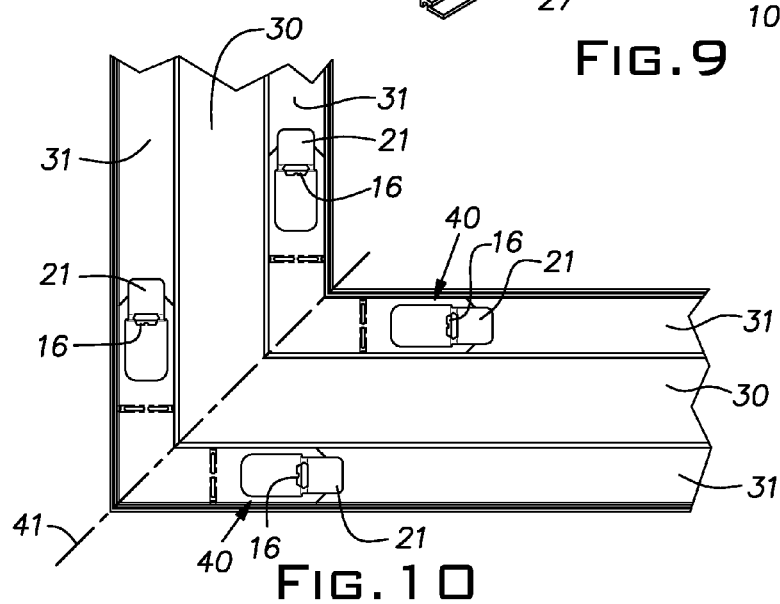

SELF-TIGHTENING SPLICE

BACKGROUND OF THE INVENTION

The invention relates to a splice for perimeter trim used in suspended ceilings.

PRIOR ART

In commercial architecture, a type of perimeter trim is available for constructing suspended island ceilings and fascias. This trim is available in lengths of extruded aluminum with several face height options. Typically, the trim's visible face is flat while its rear face, which is ordinarily concealed in use, has one or more extruded tracks. The tracks in the form of two opposed grooves, are used for attaching the trim to a suspended grid and for receiving splice plates for joining the ends of the trim.

Typically, a splice plate is assembled in the tracks at the ends of two trim pieces to be joined so that the plate bridges the joint. The splice plate serves to lock the abutting trim pieces together and aligns the visible faces of the abutting trim pieces, both vertically and horizontally.

Some prior art splice plates use set screws to secure the splice plate to the trim strips. Where the set screw bears directly against the vertical main wall of the trim strip that forms the appearance face, there is a risk that the trim strip will be distorted if the set screw is over-tightened and the appearance face will be permanently blemished.

Other prior art spice plates can be relatively expensive to produce. Locking screws incorporated in such designs can strip out when tightened with a power driver. Typically, the screw locking force does not contribute to the end-to-end tightness between the trim pieces. Some prior splices are bulky and interfere with the installation and removal of acoustical tile in a ceiling construction. Where screws are used in the splice, a power driver carried by an installer can limit the speed of the process by requiring the installer to separately handle the driver and align its tool with each screw. The installer cannot readily tighten or hold a joint tight when he is holding the power driver.

SUMMARY OF THE INVENTION

The invention provides a splice clip for joining suspended ceiling trim strips that can be installed without tools and that automatically tightens the butt joint between the strips.

The disclosed splice clip is a stamped, single piece of sheet metal. The clip has opposed locking tabs, one for each strip, that are each deployed by a finger force on an integral lever associated with a respective locking tab. Each locking tab and finger lever unit is configured so that the locking tab is pivoted over center of a hinge making the locking tab self-locking with a trim strip in the deployed position. The relative locations of the locking tab and its hinge line result in longitudinal forces that, during deployment, urge the trim strip to move relative to the splice clip. This action causes the ends of the trim strips to be drawn tightly together, thereby eliminating a gap between the trim strips.

The construction of the clip eliminates a need for separate fasteners, thereby saving manufacturing costs and installation time. There is little or no risk of parts having manufacturing defects, clip parts becoming loose or separated during shipment and/or handling, and fasteners being over-tightened or stripped out during installation.

BRIEF DESCRIPTION OF THE DRAWINGS

FIG. 4 is a fragmentary end view of a trim strip and the splice clip prior to being deployed;

FIG. 5 is a view similar to FIG. 4 showing the splice clip deployed;

FIG. 6 is a cross-sectional view, in a longitudinal plane, of a non-deployed splice clip positioned on the ends of two trim strips;

FIG. 7 is a view similar to FIG. 6, showing the splice clip being deployed and the ends of the trim strips tightly abutting;

FIG. 8 is a fragmentary rear elevational view of a pair of butt jointed trim strips spliced by a pair of the inventive splice clips;

FIG. 9 is a fragmentary isometric rear view of a mitered joint between two trim strips spliced by a pair of the inventive splice clips; and FIG. 10 is a rear view of a pair of trim strips at a miter joint made with a second embodiment of the splice clip where major faces of the trim strips are in a common plane.

DESCRIPTION OF THE PREFERRED EMBODIMENT

Figure 1:
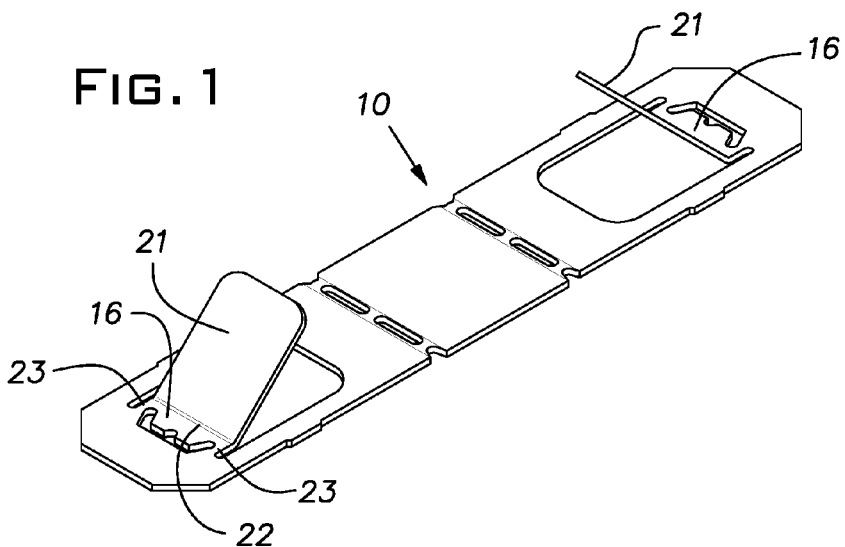
FIG. 1 is an isometric view of a first embodiment of the splice clip of the invention.
Figure 2:
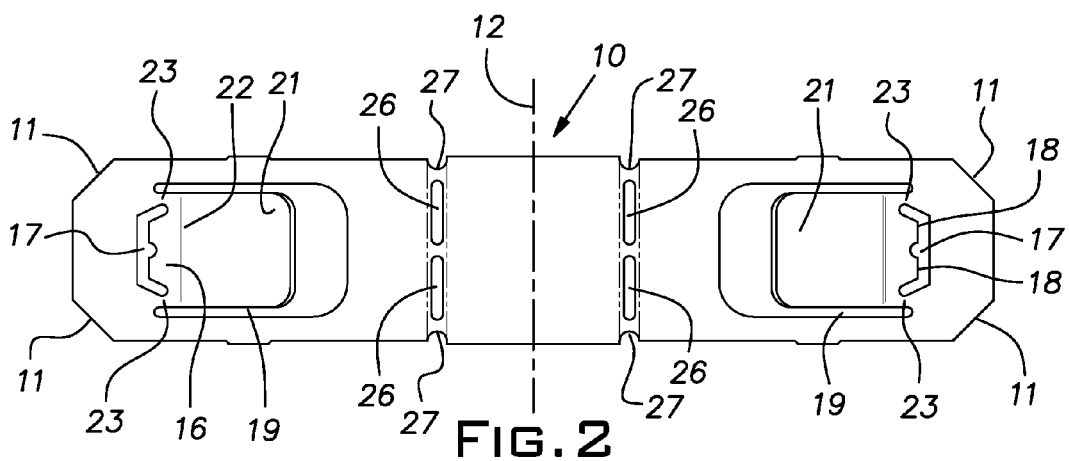
FIG. 2 is a plan view of the splice clip.

A first embodiment of a splice clip of the invention is designated by the numeral 10. The splice clip 10 is a sheet metal stamping of, for example, 0.47 inch gauge hot dipped galvanized (HDG) steel sheet. The splice clip 10 is a one-piece unit with integral parts all blanked from a single sheet of stock. The splice clip 10 is an elongated element having a generally rectangular profile in plan view. Corners 11 are clipped to facilitate positioning the splice clip into a trim strip. The splice clip 10 is symmetrical about a center line indicated at 12. A locking tab 16, distal from the center line 12, is blanked out of the sheet metal body by cutting an irregular slot 17 transverse to a longitudinal axis of the splice clip 10. The slot 17 forms locking teeth 18 on a transverse edge of the locking tab 16. A U-shaped slot 19 forms a lever 21 joined to the locking tab 16 at a juncture 22. Adjacent ends of the slots 17, 19 are spaced to leave narrow land areas 23 that serve as an integral hinge, transverse to the longitudinal direction of the clip body, for the locking tab 16.

The splice clip is weakened along a transverse line by aligned slots 26 and notches 27 to enable a person, using finger force, to bend the splice clip into a desired angle, most commonly a right angle. A weakened line of slots 26 and notches 27 is provided on each side of the center line 12.

The splice clip 10 is used with trim strips 30 that customarily serve as the perimeter of an island or peninsula suspended ceiling. Such trim strips 30 are produced as aluminum extrusions. Examples of trim strips 30 of the type being discussed are marketed by USG Interiors, LLC under the trademark COMPASSO® ELITE. This product is available in widths ranging from 2 inches to 10 inches. Depending on the width, a trim strip 30 can have 1 to 3 tracks or channels on its rear face for reception of splice clips and attachment clips as is known in the industry. FIGS. 8, 9 and 10 show 6 inch trim strips with two clip tracks.

Figure 3:
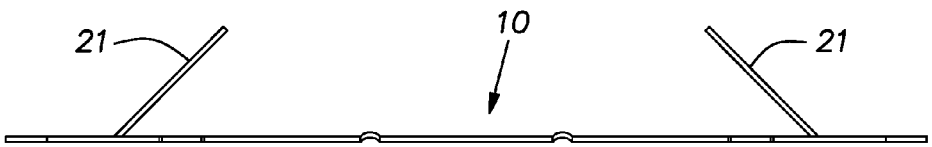
FIG. 3 is an edge view of the splice clip.

As shown in FIGS. 4 and 5, the tracks or channels, designated 31, have opposed webs 32 that establish the width of the track 31 and include re-entrant flanges 33 that retain a splice clip in a track and that determine the maximum gauge or thickness of a splice clip body. FIGS. 1 and 3 illustrate the splice clip configuration as it is manufactured for use. The width and gauge of a splice clip 10 is proportioned to slide in the tracks 31. In the manufactured state, all of the elements of the splice clip 10 are in a common plane except for the levers 21 which are bent out of the plane at an angle of, for example, 45 degrees. It will be seen that the width of the levers 21 is less than the space between the flanges 33 so that interference between these elements is avoided.

FIG. 8 illustrates a pair of clips used to make a butt joint between the ends of a pair of trim strips 30.

With particular reference to FIGS. 6 and 7, a splice clip 10 is positioned with each half of its length in a track 31 of a respective end of one of two trim strips 30 to be joined. For various reasons, initially it may not be practical to obtain a completely uniform and tight joint between the trim strip ends and a small gap as indicated at 36 in FIG. 6 may exist. Ideally, using only finger force, a lever 21 is pivoted from its original inclined orientation of 45 degrees, more or less, from the principal plane of the splice clip body through an arc of nominally 135 degrees about the integral hinge formed by the land areas 23. Movement of the lever 21 about the integral hinge is imparted to the locking tab 16 by the rigid connection between these elements. Initially, a locking tab 16 extends eccentrically from the hinge elements 23 in a direction away from the center of the clip 10. As the lever 21 pivots away from the clip center, the locking tab 16 pivots towards the splice clip center. The locking tab 16 engages the adjacent surface of the trim strip 30 and by friction and to some degree by digging into the aluminum trim strip produces a force on the strip tending to move the clip relative to the trim strip. When a lever 21 and locking tab 16 are fully deployed in this manner, the locking tab teeth 18 are slightly out of the plane of the body and being harder than the aluminum of the trim strip 30, can slightly penetrate the trim strip surface. It will be seen that the locking tab 16 is driven over center, relative to the integral hinge, so that stress in the splice clip 10 serves to self-lock the clip against the trim strip 30. When the second lever 21 and locking tab 16 are deployed, the friction force of the locking tab against the associated trim strip 30 urges the associated trim strip towards the first locked trim strip thereby contributing to a tight end-to-end butt joint between the trim strips 30.

The splice clip 10 can be used to splice a miter joint between two perpendicular trim strips 30 as shown in FIG. 9. Prior to assembling the ends of a clip 10 into respective ones of the trim strips to be joined, the splice clip 10 is manually bent along one of the bend lines formed by the slots 26 and notches 27 into a right angle or other desired angle. The levers 21 and locking tabs 16 are then deployed in the strip ends as described above. Where two or more tracks 31 and splice clips 10 are used such as shown in FIG. 9, the bend lines formed by the slots 26 and notches 27 of the splice clips 10 are staggered at the joint for greater rigidity.

A second embodiment of the splice clip 40 is illustrated in FIG. 10. The splice clip 40 has a right angle configuration for use in a miter joint of trim strips 30 where main faces of the strips are in a common plane. The clip 40, like the clip 10, is stamped of sheet metal. The clip 40 is symmetrical about a center line 41 that bisects the clip. The clip 40 has levers 21 and locking tabs 16 that are the same in structure and function as those described above in connection with the splice clip 10.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A splice clip for a trim strip of the type having a receiving track with re-entrant flanges, the clip being formed as a single piece sheet metal body having an elongated configuration with parallel edges along opposed long sides lying in a flat plane, a locking tab on each longitudinal half of the body supported on an integral hinge, each locking tab having a locking edge on a side of the respective hinge opposite a side of the respective hinge at which the locking tab exists, each locking tab being pivotal on the respective hinge from an initial position with said locking edge in said plane to a locking position in which said locking edge is out of said plane whereby it is adapted to frictionally lock against a surface of the trim strip associated with the clip receiving track.

2. A splice clip for a trim strip of the type having a clip receiving track with re-entrant flanges, the clip being formed as a single piece sheet metal body having an elongated configuration with parallel edges along opposed long sides lying in a flat plane, a locking tab on each longitudinal half of the body supported on an integral hinge having an axis transverse to the longitudinal direction of the body, each locking tab having a locking edge on a side of its respective hinge distal from a longitudinal center of the clip, each locking tab being pivotal on the respective hinge to a position where the locking edge is on a side of the respective hinge that is proximal to the longitudinal center of the clip whereby the locking edge resists movement of a trim strip that the clip is assembled with away from the longitudinal center of the clip.

3. A clip for splicing trim strips end-to-end comprising a one-piece metal body, the body being stamped from sheet metal stock and having a periphery lying in a single plane and an elongated profile when viewed perpendicularly to the plane, the body having two portions extending in opposite directions from a common center, a locking tab and a finger engageable lever on each portion of the body and lying outwardly of the center, the locking tab and lever being rigidly connected at a juncture, the locking tab being connected to laterally adjacent peripheral areas of the body by an integral hinge, the locking tab having a free edge offset from an axis of the respective hinge, the lever, locking tab and hinge being constructed and arranged whereby displacement of the lever about the hinge axis causes the locking tab to move away from an associated end of the body and towards the center such that the locking tab engages a surface of the trim strip and urges the trim strip towards the center of the clip.

4. A clip as set forth in claim 3, wherein the locking tab and associated lever are in different planes.

5. A clip as set forth in claim 4, wherein the locking tab is initially in the plane of the periphery of the body.

6. A clip as set forth in claim 4, wherein the locking tab and lever planes are at an oblique angle relative to each other.

7. A clip as set forth in claim 3, wherein the locking tab has locking teeth remote from said juncture.

8. A clip as set forth in claim 3, wherein the body includes a weakened zone to facilitate bending the body to an angle of a miter joint between abutting ends of trim strips.

* * * * *